United States Patent [19]

Takikawa et al.

[11] Patent Number: 4,819,696

[45] Date of Patent: Apr. 11, 1989

[54] SLIDE TYPE EXHAUST BRAKE SYSTEM

[75] Inventors: Kazunori Takikawa, Numazu; Ryoichi Suzuki, Mishima, both of Japan

[73] Assignee: Usui Kokusai Sangyo Kabushiki Kaisha, Sunto, Japan

[21] Appl. No.: 146,841

[22] Filed: Jan. 22, 1988

[51] Int. Cl.[4] .............................................. F16K 3/02
[52] U.S. Cl. .............................. 137/630.12; 123/323; 188/273; 251/84; 251/326
[58] Field of Search ................. 188/273; 123/323; 251/84, 175, 326; 137/630.12, 630.14, 630.15

[56] References Cited

U.S. PATENT DOCUMENTS

| | | | |
|---|---|---|---|
| 181,677 | 8/1876 | Hendrickson | 137/630.12 |
| 4,054,156 | 10/1977 | Benson | 188/273 X |
| 4,205,704 | 6/1980 | Benson | 137/630.12 |
| 4,553,648 | 11/1985 | Suzuki et al. | 188/273 |
| 4,643,226 | 2/1987 | Bälz | 251/326 X |

FOREIGN PATENT DOCUMENTS

| | | | |
|---|---|---|---|
| 119926 | 9/1980 | Japan | 123/323 |
| 44095 | 3/1916 | Sweden | 251/326 |
| 4311 | of 1818 | United Kingdom | 251/326 |

Primary Examiner—Robert E. Garrett
Assistant Examiner—Mark A. Williamson
Attorney, Agent, or Firm—Anthony J. Casella; Gerald E. Hespos

[57] ABSTRACT

Herein disclosed is a slide type exhaust brake system. In this system, a plate valve member having an exhaust pressure regulating port extending through its surface is fitted in an exhaust brake body housing having a valve member reciprocation passage extending generally at a right angle from and communicating with an exhaust flow passage having exhaust pipe joint walls projecting at its two side end portions. Moreover, a pressure regulating valve is so fastened to the leading end of the piston rod of an air cylinder mechanism extending from the end portion of the reciprocation passage as to engage with the valve member so that, upon closure of the exhaust flow passage by the valve member, the exhaust pressure regulating port is closed by the pressure regulating valve and the valve member is pushed by the leading end portion of the piston rod, whereas, upon opening of the exhaust flow passage, the exhaust pressure regulating port is opened by the pressure regulating valve and the pressure regulating valve comes into engagement with the valve member to pull up the same. The pressure regulating valve includes: a pressure regulating valve seat carrier having a generally C-shaped section and attached to the front face of a block member engaging with the valve member; and a pressure regulating valve seat fitted loosely in the seal carrier and sliding to fit closely on the abutting face of the seal carrier at the side of the valve member.

2 Claims, 1 Drawing Sheet

PRIOR ART ures to establish an arcuate wear on the sliding face when in the reciprocations for opening or closing the passage. This raises a problem that the close fit of the waste gate port 14 in the closed state is deteriorated to invite leakage of the exhaust gases thereby to drop the braking function. In order to eliminate this problem, on the other hand, the waste gate 18 and the seal 19 including their slot 18' and bulging wall 19' have to be precisely cast to remarkably block the productivity.

SLIDE TYPE EXHAUST BRAKE SYSTEM

BACKGROUND OF THE INVENTION

1. Field of the Invention

The present invention relates generally to a slide type exhaust brake system which is connected midway of the exhaust pipe of a large-sized vehicle such as a motor truck or an omnibus to exert a braking function to the vehicle by closing the exhaust flow passage of engine exhaust gases when the vehicle is running steep downhill and, more particularly, to an improvement in the structure of a pressure regulating valve of the slide type exhaust brake system.

2. Description of the Prior Art

As the exhaust brake system of this type, there is known U.S. Pat. No. 4,205,704. The pressure regulating valve disclosed in this U.S. Patent will be described in detail with reference to FIG. 5. A primary gate 13 having a waste gate port 14 in its surface is fitted in a reciprocation passage formed in a body housing of the exhaust brake system. A pressure regulating valve 17 is disposed in the vicinity of the leading end of a piston rod 16 of an air cylinder mechanism. A waste gate seal 19 slides on the surface of a waste gate 18 at the side of the primary gate 13. The waste gate seal 19 and the waste gate 18 are loosely fitted on each other to have their slot 18' and bulging wall 19' engaging with each other.

However, the pressure regulating valve 17 of the prior art is compelled in its design to be fitted loosely at its restricted portion by the limited size of the primary gate 13 and by the least size of the waste gate 18 required for the smooth operation of the primary gate 13. Moreover, the loosely engaging portions are caused to "chatter" by the loose engagement and by the impact of the waste gate 18 upon the primary gate 13 when the passage is to be closed due to the frequent reciprocations of the primary gate 13. The chattering in turn causes the waste gate seal 19 to incline in the longitudinal direction to establish an arcuate wear on the sliding face when in the reciprocations for opening or closing the passage. This raises a problem that the close fit of the waste gate port 14 in the closed state is deteriorated to invite leakage of the exhaust gases thereby to drop the braking function. In order to eliminate this problem, on the other hand, the waste gate 18 and the seal 19 including their slot 18' and bulging wall 19' have to be precisely cast to remarkably block the productivity.

SUMMARY OF THE INVENTION

In order to solve the above-specified problem of the prior art, therefore, an object of the present invention is to provide an exhaust brake system in which a pressure regulating valve is constructed of a pressure regulating valve seal carrier having a generally C-shaped section and a pressure regulating valve seal fitted loosely in the seal carrier, which is given a sufficient engagement in the depthwise direction by the loose insertion construction of the valve seal, which is freed from such fatigue and "chattering" at the loosely fitting portions as might otherwise be caused by the impact of the block member upon the valve member when in the passage closing operation, by the simple construction having the seal carrier attached to leading end portion of the piston rod at the front face of a block member engaging with the valve member, which improves the mechanical strength of the loosely fitting portions of the whole valve seal in the seal carrier, which eliminate the inclined side of the valve seal in the longitudinal direction when in the reciprocations to ensure the close fit of the exhaust pressure regulating port when in the closing operation thereby to hold a satisfactory braking function, and which is enabled to improve the productivity by easily pressing the pressure regulating valve of a plate material.

According to the present invention, there is provided a slide type exhaust brake system, in which a plate valve member having an exhaust pressure regulating port extending through its surface is fitted in an exhaust brake body housing having a valve member reciprocation passage extending generally at a right angle from and communicating with an exhaust flow passage having exhaust pipe joint walls projecting at its two side end portions, and in which a pressure regulating valve is so fastened to the leading end of the piston rod of an air cylinder mechanism extending from the end portion of said reciprocation passage as to engage with said valve member so that, upon closure of said exhaust flow passage by said valve member, said exhaust pressure regulating port is closed by said pressure regulating valve and said valve member is pushed by the leading end portion of said piston rod, whereas, upon opening of said exhaust flow passage, said exhaust pressure regulating port is opened by said pressure regulating valve and said pressure regulating valve comes into engagement with said valve member to pull up the same. Said pressure regulating valve includes: a pressure regulating valve seal carrier having a generally C-shaped section and attached to the front face of a block member engaging with said valve member in the vicinity of the leading end of said piston rod; and a pressure regulating valve seal fitted loosely in said seal carrier and sliding to fit closely on the abutting face of said seal carrier at the side of said valve member. Moreover, the valve seal is constructed of a bent wall having its two longitudinal side end portions bent in a common direction.

DETAILED DESCRIPTION OF THE PREFERRED EMBODIMENTS

Figure 1:
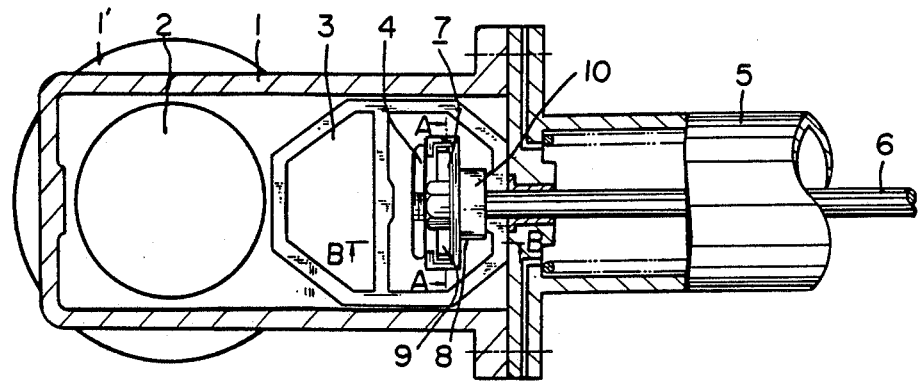
FIG. 1 is a partially cut-away longitudinal section showing a slide type exhaust brake system according to one embodiment of the present invention.
Figure 2:
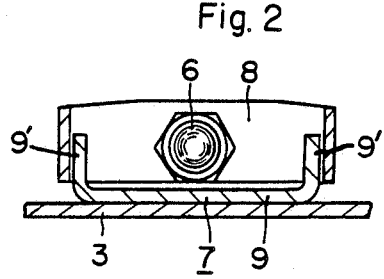
FIG. 2 is a sectional end face showing an essential portion of an enlarged scale and taken along line A—A of FIG. 1.
Figure 3:
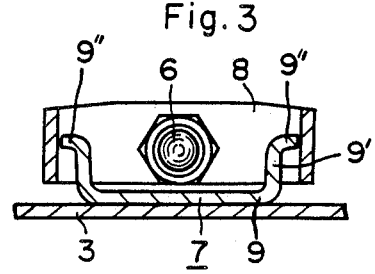
FIG. 3 is similar to FIG. 2 but shows another embodiment.
Figure 4:
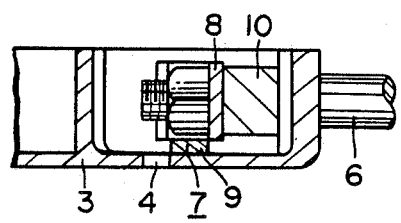
FIG. 4 is a sectional end face showing an essential portion of an enlarged scale and taken along line B—B of FIG. 1.
Figure 5:
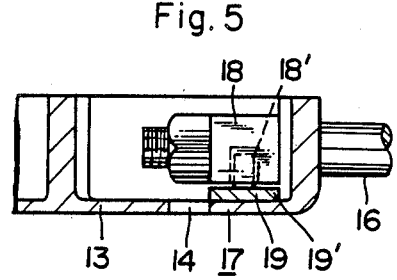
FIG. 5 is similar to FIG. 4 but shows an example of the prior art.

In the accompanying drawings, reference numeral 1 denotes an exhaust brake body housing which is formed with exhaust pipe joint walls 1' and 1' at its two side end portions and which extends generally at a right angle from an exhaust flow passage 2 and communicates with the reciprocation passage of a plate valve member 3. This valve member 3 fitted to the reciprocation passage of that housing 1 is formed in its surface with an exhaust pressure regulating port 4 extending therethrough. In the vicinity of the leading end portion of a piston rod 6 of an air cylinder mechanism 5 extending from the end portion of the reciprocation passage, moreover, there is disposed a block member 10 which is in engagement with the valve member 3. Reference numeral 7 denotes a pressure regulating valve which is constructed of: a pressure regulating valve seal carrier 8 having a generally C-shaped section and attached to the front face of the block member 10 engaging with the valve member 3 in the vicinity of the leading end of the piston rod 6; and a pressure regulating valve seal 9 fitted loosely in the seal carrier 8 to be guided by the seal carrier 8 in such a manner as to restrict an inclination of the pressure regulating valve 7 in its sliding direction and in the direction traverse to the sliding direction and sliding to fit closely on the abutting face of the seal carrier 8 at the side of the valve member 3. The valve seal 9 has a pair of bent walls 9' bent in a common direction from the two longitudinal side end portions thereof (as shown in FIG. 2) and is formed by extending ribs 9" outward from the end portions of the paired bent walls 9' (as shown in FIG. 3).

With the construction thus far described, according to the present invention, when the passage is to be closed by the valve member 3, the valve seal 9 acting as the pressure regulating valve 7 is brought into close fit on the exhaust pressure regulating port 4 by the pressure of the exhaust gases so that the leading end portion of the piston rod 6 pushes said valve member to close the exhaust flow passage 2. When in the passage opening operation, on the contrary, the block member 10 is caused to impact upon the valve member 3 to pull it up while the exhaust pressure regulating port 4 being opened by the portion of the valve seal 9. In this operating state, the pressure regulating valve 7 is constructed of the seal carrier having a generally C-shaped section and the valve seal 9 which is fitted loosely in the seal carrier 8. Moreover, the pressure regulating valve 7 is attached to the front face of the block member 10 impacting upon the valve member 3 so that the fatigue and "chattering" at the mutually fitting portions can be eliminated even when in the impacting engagement. As a result, the sliding motions of the valve seal 9 during the reciprocations can be effected without any longitudinal inclination but in the stable fitting state of the whole sliding face. Thanks to the aforementioned fitting construction, moreover, the pressure regulating valve 7 can have its mechanical strength at the mutually-fitting portions.

As has been described hereinbefore, the slide type exhaust brake system of the present invention has its pressure regulating valve 7 constructed of the seal carrier 8 and the valve seal 9 fitted loosely in the seal carrier 8, and the pressure regulating valve 7 is attached to the front face of the block member 10. Despite this simple construction, the valve seal 9 can slide stably on the surface of the valve member 3 when reciprocating to fit closely on the exhaust pressure regulating port 4 without fail when in the passage closing operation so that the braking function can be exhibited effectively for a long term. On the other hand, the pressure regulating valve 7 can be simply pressed of a plate material to improve the productivity.

What is claimed is:

1. In an exhaust brake system, in which a plate valve member having an exhaust pressure regulating port extending through its surface is fitted in an exhaust brake body housing having a valve member reciprocation passage extending generally at a right angle from and communicating with an exhaust flow passage having exhaust pipe joint walls projecting at its two side end portions, and in which a pressure regulating valve is so fastened to the leading end of a piston rod of an air cylinder mechanism extending from an end portion of said reciprocation passage as to engage with said plate valve member so that movement of said piston rod out of said air cylinder effects closure of said exhaust flow passage by said plate valve member, and further effects closure of said exhaust pressure regulating port by said pressure regulating valve, and with said plate valve member being pushed by the leading end portion of said piston rod, whereas, movement of said piston rod into said air cylinder effects opening of said exhaust pressure regulating port by said pressure regulating valve and moves said pressure regulating valve into engagement with said plate valve member to pull the plate valve member out of the exhaust flow passage, a slide type exhaust brake system wherein said pressure regulating valve includes: a pressure regulating valve seal carrier having a generally C-shaped section and attached to the piston rod; a block member mounted to said piston rod intermediate said carrier and said air cylinder, said block being engageable with said plate valve member to move said plate valve member out of said exhaust flow passage upon movement of said piston rod into said cylinder; and a pressure regulating valve seal of generally C-shape and having a sealing portion for sealing said exhaust pressure regulating port in said plate valve member and a pair of walls extending in a common direction from opposed ends of said sealing portion, said pair of walls being fitted in said seal carrier for slidable movement relative to said seal carrier parallel to said exhaust flow passage, such that upon movement of said piston rod, said C-shaped pressure regulating valve seal carrier exerts equal forces on said walls of said pressure regulating valve seal to move said pressure regulating valve seal without tilting.

2. A slide type exhaust brake system as in claim 1 wherein said pressure regulating valve seal is press formed of a plate material.

* * * * *